US012153270B2

(12) United States Patent
Takeuchi et al.

(10) Patent No.: US 12,153,270 B2
(45) Date of Patent: Nov. 26, 2024

(54) DROP CABLE BOX

(71) Applicant: Go!Foton Holdings, Inc., Somerset, NJ (US)

(72) Inventors: Kenichiro Takeuchi, North Brunswick, NJ (US); David Zhi Chen, Dallas, TX (US)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days.

(21) Appl. No.: 17/150,318

(22) Filed: Jan. 15, 2021

(65) Prior Publication Data

US 2022/0229252 A1    Jul. 21, 2022

(51) Int. Cl.
*G02B 6/44*    (2006.01)

(52) U.S. Cl.
CPC ......... *G02B 6/4444* (2013.01); *G02B 6/4447* (2013.01); *G02B 6/4453* (2013.01)

(58) Field of Classification Search
CPC ... G02B 6/4444; G02B 6/4447; G02B 6/4453
See application file for complete search history.

(56) References Cited

U.S. PATENT DOCUMENTS

| 6,648,520 | B2 | 11/2003 | McDonald et al. |
| 6,899,467 | B2 | 5/2005 | McDonald et al. |
| 7,090,406 | B2 | 8/2006 | Melton et al. |
| 7,113,679 | B2 | 9/2006 | Melton et al. |
| 7,333,708 | B2 | 2/2008 | Blackwell, Jr. et al. |
| 7,740,409 | B2 | 6/2010 | Bolton et al. |
| 2013/0196538 | A1* | 8/2013 | Takeuchi ............... H01R 13/58 439/571 |
| 2014/0355936 | A1* | 12/2014 | Bund .................... G02B 6/3846 385/81 |
| 2016/0178859 | A1* | 6/2016 | Thompson ........... G02B 6/3825 385/56 |
| 2017/0276887 | A1 | 9/2017 | Allen |
| 2017/0336577 | A1* | 11/2017 | Kaplan ............... G02B 6/3888 |
| 2018/0045905 | A1* | 2/2018 | Cote .................... G02B 6/3889 |
| 2018/0081136 | A1* | 3/2018 | Hill ........................ G02B 6/4444 |
| 2019/0170961 | A1 | 6/2019 | Coenegracht et al. |
| 2020/0049920 | A1* | 2/2020 | Takeuchi ........... G02B 6/44775 |

FOREIGN PATENT DOCUMENTS

WO    2019006121 A1    1/2019

OTHER PUBLICATIONS

Extended European Search Report issued in Appln. No. 22150016.8 mailed Jun. 9, 2022 (9 pages).

* cited by examiner

*Primary Examiner* — Sung H Pak
*Assistant Examiner* — Hoang Q Tran
(74) *Attorney, Agent, or Firm* — Lerner David LLP

(57) ABSTRACT

A multi-cable terminal including a plurality of sub-structures, each of the sub-structures defining a sub-enclosure and being openable independent of the other sub-structures to provide access to the sub-enclosure, and a frame that secures the plurality of sub-structures such that the frame and sub-structures define a main enclosure. Each of the sub-enclosures is configured to accommodate a multiple of cable connection elements such that a watertight seal is created around the cable connection elements when the corresponding sub-structure is closed.

20 Claims, 11 Drawing Sheets

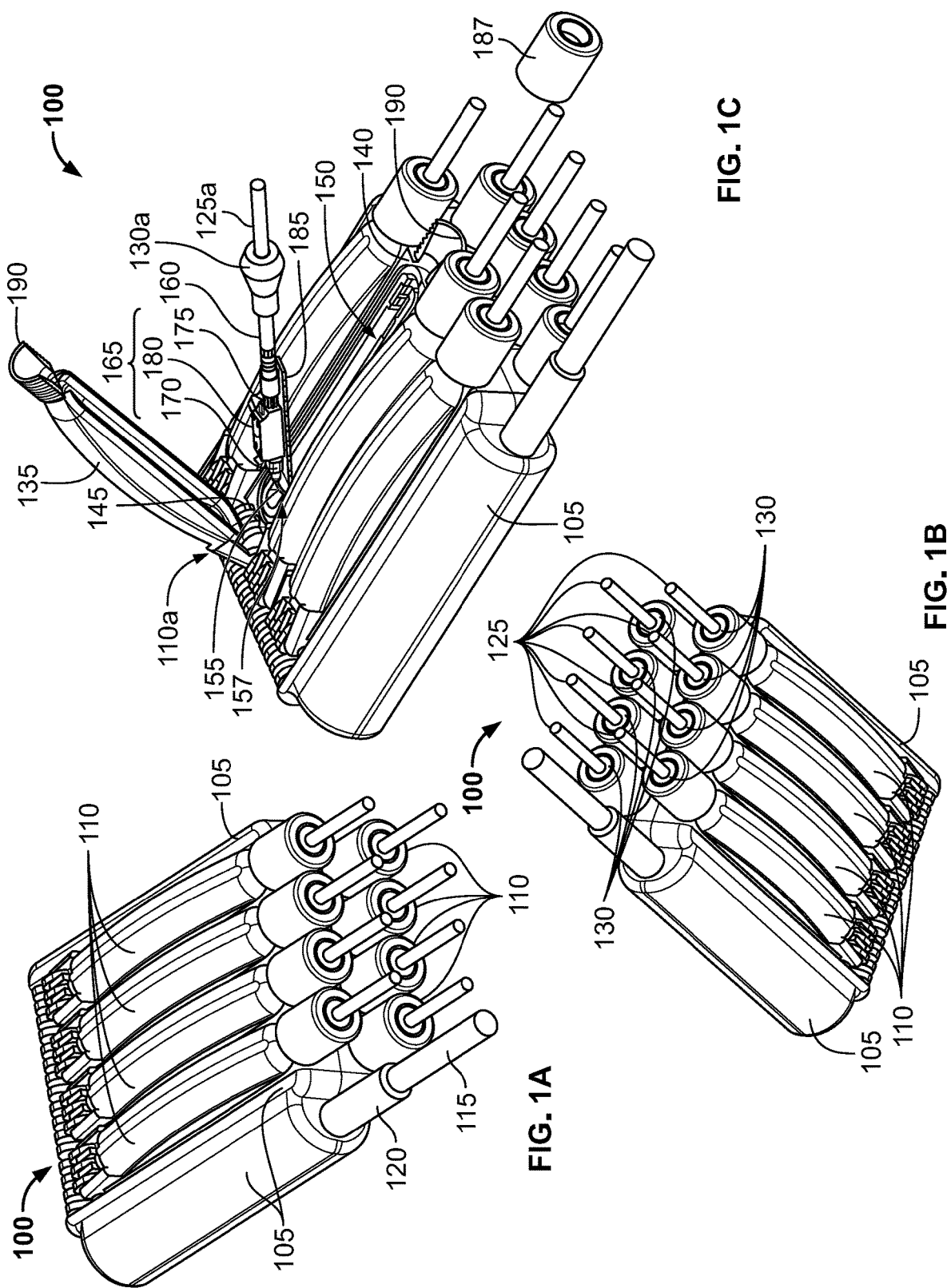

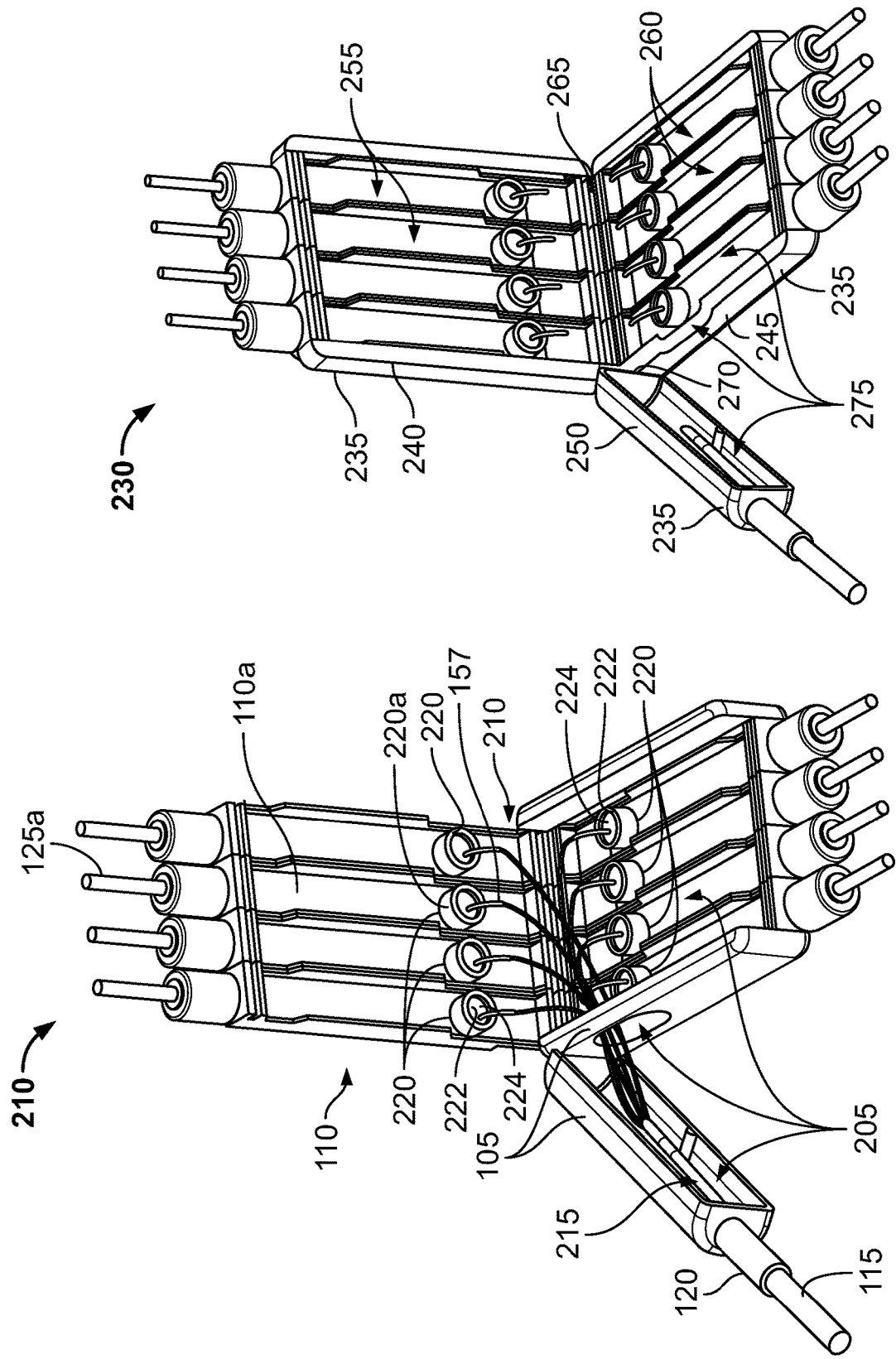

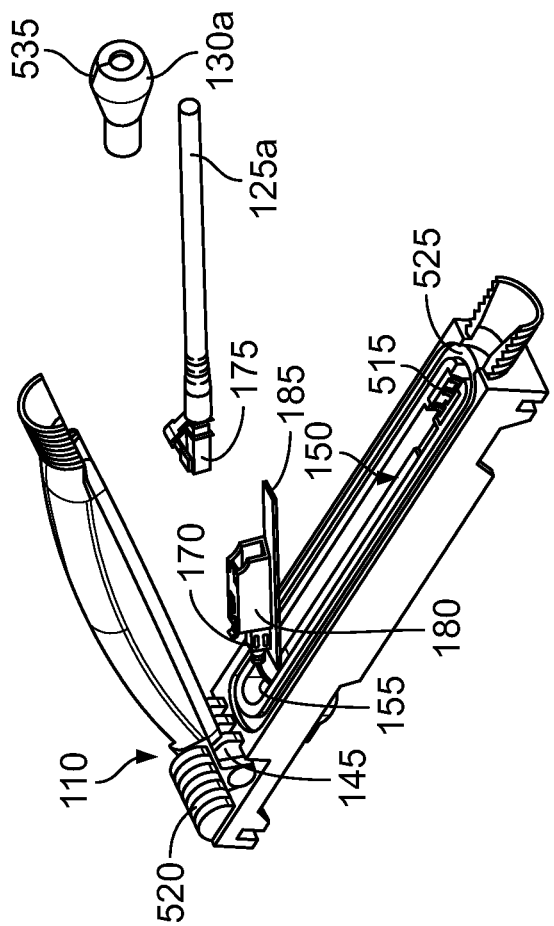
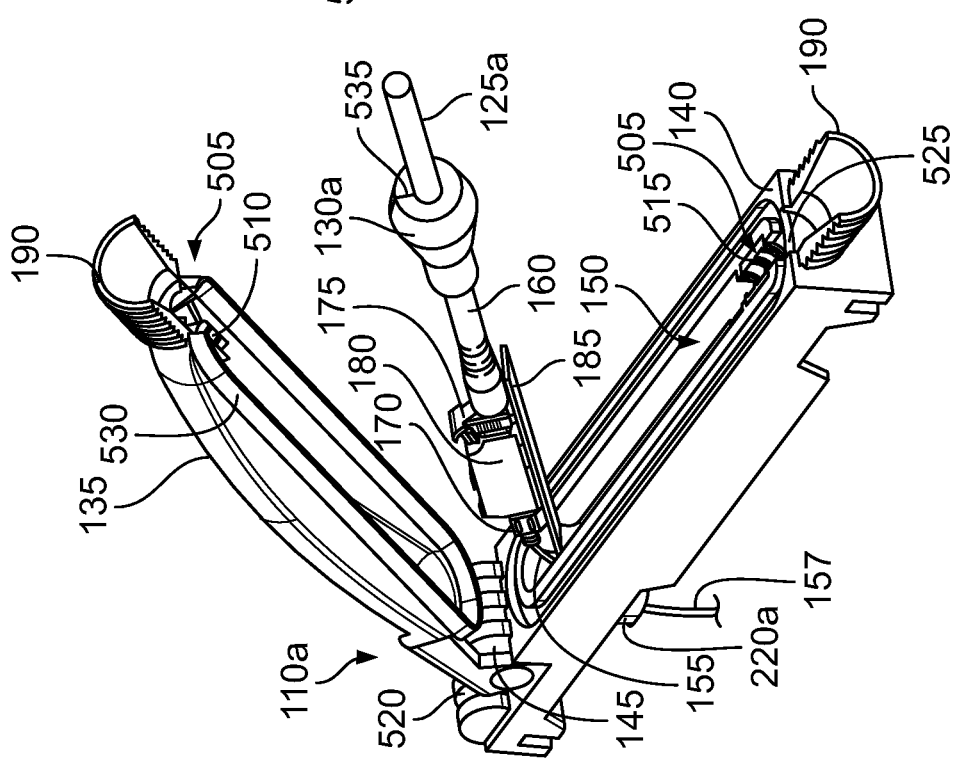
FIG. 5B
FIG. 5A

DROP CABLE BOX

BACKGROUND

The increasing deployment of electronic and fiber optic networks has given rise to an increasing need to manage the distribution of signals in such networks. Often, the distribution of signals is managed through the routing of cables associated with the signals and involves the use of multi-cable terminals that allow for selective connection between cables at designated points in a network.

The increasing need to manage signal distribution is particularly acute with respect to fiber optic communications. For example, fiber optic communication signals between individual homes and a fiber network may be implemented through an Outside Plant (OSP) terminal, such as a drop box. In such a system, the terminal may couple a high capacity main cable to a multiple of lower capacity cables so that communication signals for each home may be delivered via the corresponding low capacity dedicated cable. In this manner, there is no need to run a high capacity cable to each home. Moreover, the terminal may be constructed so as to allow cables to be easily connected to the terminal and easily disconnected from the terminal, as dictated by circumstance. For instance, if a home's dedicated cable is damaged the cable may be readily disconnected from the terminal and replaced with a new cable.

BRIEF SUMMARY

In creating the technology described in this disclosure, it was recognized that a desirable feature of multi-cable terminals is an optimized combination of ease-of-use and component protection. Such optimization is among the advantages of the technology.

In accordance with an aspect of the technology describe in this disclosure, a multi-cable terminal includes a plurality of sub-structures, each of the sub-structures defining a sub-enclosure and being openable independent of the other sub-structures to provide access to the sub-enclosure; and a frame that secures the plurality of sub-structures such that the frame and sub-structures define a main enclosure, wherein each of the sub-enclosures is configured to accommodate at least an end of an internal cable, an end of a service cable, and a plurality of cable connection elements, such that when the end of the internal cable, the end of the service cable, and the cable connection elements are positioned in the sub-enclosure and a cable seal for the service cable is positioned in the corresponding sub-structure, a watertight seal is created around the cable connection elements when the corresponding sub-structure is closed.

BRIEF DESCRIPTION OF THE DRAWINGS

The accompanying drawings are not intended to be drawn to scale. Also, for purposes of clarity not every component may be labeled in every drawing.

FIG. 1A is a perspective view, from a first viewpoint, of a multi-cable terminal in accordance with an embodiment.

FIG. 1B is a perspective view, from a second viewpoint, of the multi-cable terminal of FIG. 1A.

FIG. 1C is a perspective view of the multi-cable terminal of FIGS. 1A and 1B showing a sub-structure of the terminal in an open position.

FIG. 2A is a perspective view showing a main enclosure of a multi-cable terminal according to an embodiment.

FIG. 2B is a perspective view showing a main enclosure of a multi-cable terminal having an openable frame.

FIG. 5A is a perspective view of the sub-structure of FIG. 1C, with the sub-structure shown in an open position.

FIG. 5B is an exploded perspective view of the sub-structure of FIG. 5A.

DETAILED DESCRIPTION

Figure 3B:
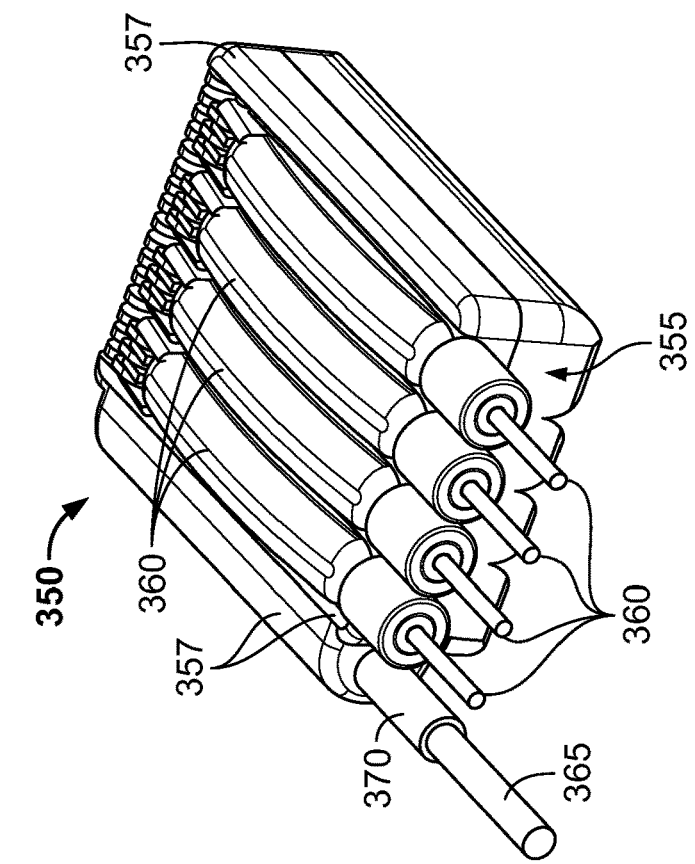
FIG. 3B is a perspective view of a multi-cable terminal including an accessory section.

Examples of systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

FIG. 1A is a perspective view, from a first viewpoint, of a multi-cable terminal 100 in accordance with an embodiment. The multi-cable terminal 100 includes a frame 105 and a multiple of sub-structures 110. The frame 105 is configured to secure the sub-structures 110 and to accommodate a main cable 115 and a main cable seal 120.

FIG. 1B is a perspective view, from a second viewpoint, of the multi-cable terminal 100 of FIG. 1A. As shown in FIG. 1B, each of the sub-structures 110 is configured to accommodate a respective one of a multiple of service cables 125 and a respective one of a multiple of cable seals 130 for the service cables 125.

FIG. 1C is a perspective view of the multi-cable terminal 100 of FIGS. 1A and 1B showing one the sub-structures 110 (designated as sub-structure 110a) of the terminal in an open position. As can be seen from FIG. 1C, the substructure 110a may include a lid 135 and a base 140. The lid 135 may be movably connected to the base 140 by, for example, a hinge 145. The lid 135 and base 140 together define a sub-enclosure 150, with the sub-enclosure 150 configured to accommodate at least an end 155 of an internal cable 157 and an end 160 of the corresponding one of the service cables (designated as service cable 125a). Also, the lid 135 and base 140 are configured to accommodate a corresponding one the cable seals 130 (designated as cable seal 130a) for the service cable 125a.

The sub-enclosure 150 is further configured to accommodate a multiple of cable connection elements 165. In the depicted embodiment, the cable connection elements 165 include a first connector 170 for the end 155 of the internal cable 157, a second connector 175 for the end 160 of the service cable 125a, and an adaptor 180 for coupling the first connector 170 to the second connector 175. In this manner, the internal cable 157 and service cable 125a may be coupled to one another by way of the first connector 170, second connector 175 and adaptor 180.

In addition, the sub-enclosure 150 may be configured to accommodate a support member 185. The support member 185 may be used to secure one or more of the cable connection elements 165, e.g., to secure adaptor 180, as shown. Moreover, the support member 185 may be movable so that the secured connection elements are movable with the support member 185 when the sub-structure 110a is in an open position. For instance, the support member 185 may be connected to the sub-enclosure 150 by a hinge (not shown). Further, the support member 185 may be arranged to move automatically into an exposed position (as shown in FIG. 1C) when the sub-structure 110a is opened.

Notably, in some embodiments, when the end 155 of the internal cable 157, the end 160 of the service cable 125a, and the cable connection elements 165 are positioned in the sub-enclosure 150, the cable seal 130a of service cable 125a is positioned in the sub-structure 110a, and the lid 135 of the sub-structure 110a is closed against the base 140 of the sub-structure 110a, a watertight seal is created around the cable connection elements 165. Further, a fastener 187 may be provided for securing the sub-structure 110a in the closed position. In the FIG. 1C configuration, the fastener 187 is threaded for engagement with a threaded end 190 of the sub-structure 110a, and the service cable 125a passes through the fastener 187 when the end 160 of the service cable 125a is positioned in the sub-enclosure 150, the cable seal 130a of service cable 125a is positioned in the sub-structure 110a, and the sub-structure 110a is secured in the closed position.

Additional views of sub-enclosure 110a are provided in FIGS. 5A, 5B, and 6, to be described later.

Referring back to the multi-cable terminal 100 in general, each of the sub-structures 110 may take the same form as sub-structure 110a. However, it should be noted that it is not necessary for the sub-structures 110 to have the same form as each other, or to take the form of sub-structure 110a. For example, the multi-cable terminal 100 may include some sub-structures having the form of sub-structure 110a and other sub-structures that take a different form. Or the multi-cable terminal 100 may include only sub-structures having a form different from the form of sub-structure 110a.

Turning now to FIG. 2A, a perspective view is provided showing a main enclosure 205 of a multi-cable terminal 210 according to an embodiment. The main enclosure 205 is formed when the frame 105 and sub-structures 110 are in a closed position relative to each other, as shown for example, in FIGS. 1A-1C, and may be a watertight enclosure. The depiction of FIG. 2A is provided for purposes of envisioning the main enclosure 205. As can be seen from FIG. 2A, the main enclosure 205 may be configured to accommodate a multiple of internal cables 210 and an end 215 of main cable 115. The internal cables 210 may be respectively provided to the sub-enclosures of the sub-structures 110 through ports 220, the ports 220 being respective parts of the sub-structures 110 and including port openings 222 and port seals 224. For example, internal cable 157 may be provided to sub-enclosure 150 of sub-structure 110a via port 220a. In some embodiments, the ports 220 provide respective watertight seals between the internal cables 210 and respective watertight seals between the sub-enclosures and the main enclosure 205. For example, port 220a may provide a watertight seal about internal cable 157 and may provide a watertight seal between sub-enclosure 150 of sub-structure 110a and main enclosure 205.

As can be further seen from FIG. 2A, the internal cables 210 may be fanned out from the end 215 of main cable 115. That is, in some embodiments the main cable 115 may be made up of a group of individual cables and the individual cables may be split off from the main cable 115 within the main enclosure to form the multiple of internal cables 210.

In the embodiment of FIG. 2A, the frame 105 and sub-structures 110a are permanently or semi-permanently sealed into the closed position relative to each other, as depicted in FIGS. 1A-1C, before the multi-cable terminal 210 is deployed. For example, the frame 105 and sub-structures 110a may be glued or welded into position, or fixed into position with one or more screws. However, in other embodiments, a multi-cable terminal is formed so that the structure formed by the closed frame and sub-structures is openable so that the main enclosure may be accessed at any time. FIG. 2B depicts one such embodiment.

FIG. 2B is a perspective view showing a main enclosure 275 of a multi-cable terminal 230 having an openable frame 235. As can be seen from FIG. 2B, the openable frame 235 may be made up of a first primary portion 240, a second primary portion 245, and a main cable section 250. The first primary portion 240 may be configured to support a first group of sub-structures 255, and the second primary portion may be configured to support a second group of sub-structures 260. By way of example, each of the sub-structures in the first group of sub-structures 255, and each of the sub-structures in the second group of sub-structures 260 may be in the form of sub-structure 110a. As can be further seen from the figure, the first primary portion 240 and the second primary portion 245 may be connected to each other by a hinge 265, and the main cable section 250 may be connected to one of the primary portions (primary portion 245 in the depicted embodiment) by a hinge 270. When the first primary portion 240 and/or second primary portion 245 are rotated about hinge 265 so that they contact each other, and the main cable section 250 is rotated about hinge 270 to contact the two primary portions 240 and 245, the openable frame 235 is in a closed position and a main enclosure 275 is defined by first primary portion 240, second primary portion 245, main cable section 250, sub-structures 255 and sub-structures 260. Such main enclosure 275, with main cable 115 and main cable seal 120 positioned in the main cable section, may be a watertight enclosure. In some embodiments, one or more fasteners, such as one or more screws, may be used to hold the openable frame 235 in a watertight closed position. Moreover, in the embodiments using one or more screws to hold the openable frame 235 in a watertight closed position, gaskets (not shown) may be included between the first primary portion 240 and the second primary portion 245, and between the main cable section 250 and the first and second primary portions 240 and 245.

In further regard to FIG. 2B, it should be noted that the embodiments are not limited to including hinge 265 and/or hinge 270. The wide range of elements that may be used in lieu of hinge 265, and the wide range of elements that may be used in lieu of hinge 270, will be readily apparent upon reading this description.

Having described some embodiments that appear to have the same overall form factor, it should be noted that the present technology is not limited to such form factor. For example, FIG. 3A shows a perspective view of a multi-cable terminal 300 which is in accordance with the technology and which can accommodate a larger number of service cables. The multi-cable terminal 300 includes a frame 305 that secures a multiple of sub-structures 310 and is configured to accommodate a main cable 315 and a main cable seal 320. Each of the sub-structures 310 is configured to accommodate a respective one of a multiple of service cables 325 and a respective one of a multiple of cable seals 330 for the service cables 325. As in the embodiments of FIGS. 1A-2B, in the embodiment of FIG. 3A the sub-structures 310 are openable and may define respective sub-enclosures (not shown). Also, as in the case of the embodiments of FIGS. 1A-2B, in the FIG. 3A embodiment the frame 305 and sub-structures 310 may define a main enclosure (not shown). In one possible implementation, each of the sub-structures 310 have the same form as the sub-structure 110a, although in other implementations all of the sub-structures 310 may have a different form than that of sub-structure 110a or some of the sub-structures 310 may have a different form than that of sub-structure 110a.

Figure 3A:
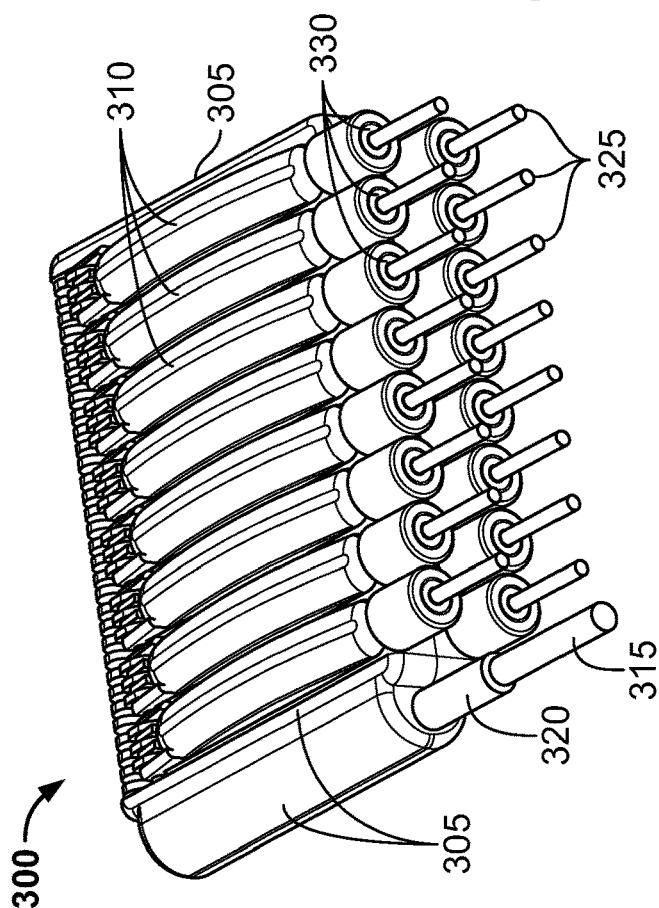
FIG. 3A is a perspective view of a multi-cable terminal for accommodating a larger number of cables.

FIG. 3B shows a perspective view of a multi-cable terminal 350 including an accessory section 355. The multi-cable terminal 350 includes a frame 357 that secures a multiple of sub-structures 360 and is configured to accommodate a main cable 365 and a main cable seal 370. Each of the sub-structures 360 is configured to accommodate a respective one of a multiple of service cables 375 and a respective one of a multiple of cable seals 380 for the service cables 375. As in the embodiments of FIGS. 1A-3AB, in the embodiment of FIG. 3B the sub-structures 360 are openable and may define respective sub-enclosures (not shown). Further, the frame 357, accessory section 355, and sub-structures 360 may define a main enclosure (not shown). In one possible implementation, each of the sub-structures 360 has the same form as that of sub-structure 110a, although in other implementations all of the sub-structures 360 may have a different form than that of sub-structure 110a or some of the sub-structures 360 may have a different form than that of sub-structure 110a.

The accessory section 355 of the FIG. 3B configuration may include a portion of the main enclosure or may be separated from the main enclosure. In any event, the accessory section 355 may provide watertight housing for one or more accessories. By way of illustration, the accessories housed in the accessory section 355 may include one or more splitters, splice trays, tap modules, wavelength division multiplexors (WDMs), and/or monitoring systems. For example, the accessory section 355 may house a tap module and a monitoring system, with the tap module used to split off a small percentage of signals carried by one of service cables 360 and the monitoring system used to analyze the split off portion of a signal. In one such application, the monitoring system may be used to determine the strength of a monitored signal.

Figure 4B:
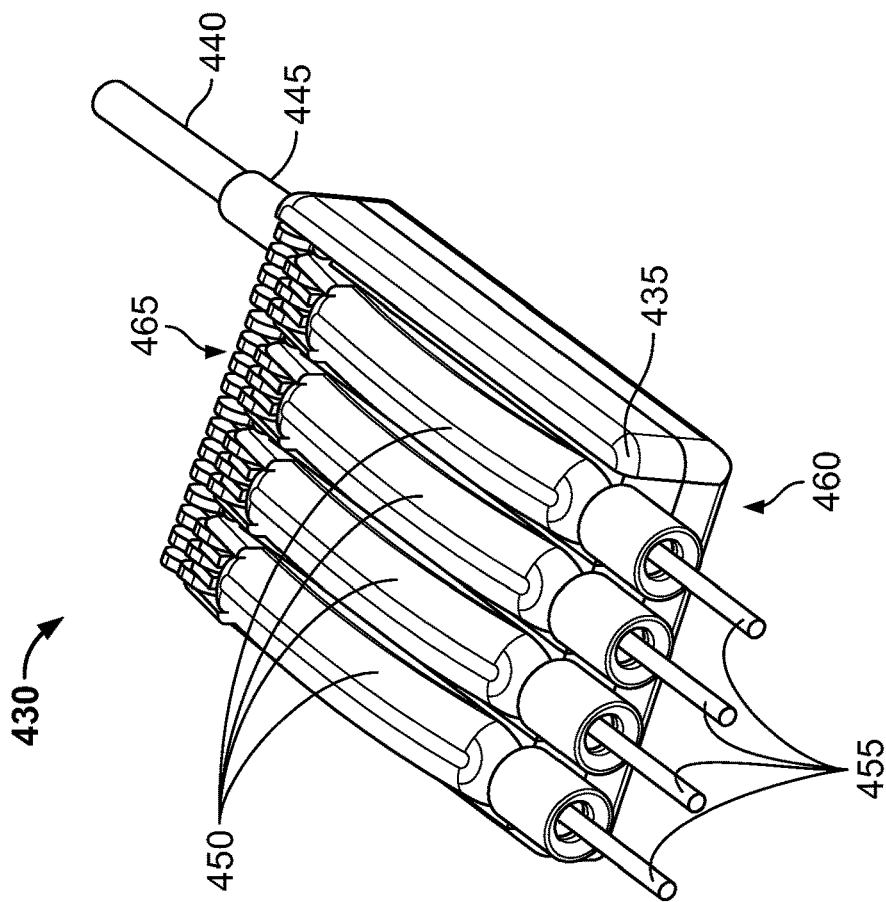
FIGS. 4A and 4B are perspective views of multi-cable terminals having different main cable accommodations.
Figure 4A:
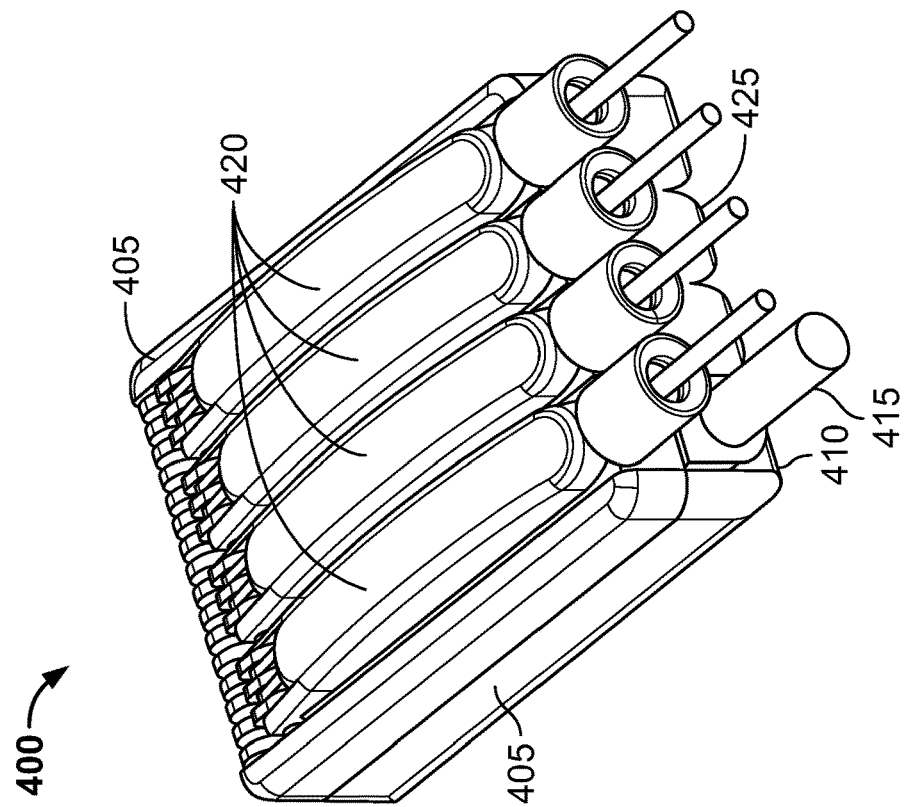

FIGS. 4A and 4B are perspective views of multi-cable terminals having different main cable accommodations. FIG. 4A shows a multi-cable terminal 400 having a frame 405 that includes a less prominent main cable section 410 for accommodating a main cable 415. The multi-cabler terminal 400 also includes a multiple of sub-structures 420 and an accessory section 425. By way of example, the sub-structures 420 are illustrated as taking the form of a sub-structure like that illustrated in FIG. 7A (to be described later). In any event, the frame 405, sub-structures 420, and accessory section 425 define a main enclosure (not shown).

FIG. 4B shows a multi-cable terminal 430 having a frame 435 accommodating a main cable 440 and a main cable seal 445. The multi-cable terminal 430 includes sub-structures 450 which are oriented to accommodate a multiple of service cables 455 along a first side 460 of frame 435. As shown, the main cable 440 and main cable seal 445 are accommodated on a second side 465 of frame 435, with the second side 465 being opposite the first side 460.

Turning now to FIG. 5A, there is shown a perspective view of the sub-structure 110a of FIG. 1C in an open position. Further, FIG. 5B is an exploded perspective view of the sub-structure 110a. As can be seen from FIGS. 5A and 5B, sub-structure 110a may include an anchoring portion 505 made up of an upper cable anchor 510 and a lower cable anchor 515. Each of the upper cable anchor 510 and lower cable anchor 515 may be an integral part of the sub-structure 110a, such as a molded part, or may be removable part. In either case, the anchoring portion 505 acts to inhibit movement of service cable 125a, relative to the sub-structure 110a, in a direction along the axis of service cable 125a when the end 160 of cable 125a is positioned in the enclosure 150 and the sub-structure 110a is closed.

FIGS. 5A and 5B also show a hinge 520. The hinge 520 movably couples the sub-structure 110a to the frame 105 (shown in FIG. 1C) so that the main enclosure 205 (shown in FIG. 2A) can be accessed by moving the sub-structure 110a about the hinge 520. Notably, hinge 520 is distinct from hinge 145, with hinge 520 allowing access to the main enclosure 205 independent of access to the sub-enclosure 150. Further, it should be noted that the embodiments are not limited to including a hinge, such as hinge 520. For example, a stopper may be used in lieu of hinge 520, with the stopper functioning to limit movement of the sub-structure 110a relative to the frame 105.

In addition, FIGS. 5A and 5B show a gasket 525 positioned in the base 140 of the sub-structure 110a and a lip 530 that is part of the lid 135 of the sub-structure 110a. The gasket 525 contacts the lip 530 and cable seal 130a when the cable seal 130a is positioned in the sub-structure 110a and the sub-structure 110a is in a closed position. Moreover, it is noted that the cable seal 130a may be provided apart from the service cable 125a and placed on service cable 125a, followed by placement of the end 160 of service cable 125a in sub-enclosure 150 and the placement of the cable seal 130 in the sub-structure 110a. It is also noted that the cable seal 130a may be provided with a slit 535 to facilitate placement of the cable seal 130a on the service cable 125a. That is, the cable seal 130a may be held in a manner that a gap is created along the slit 535, the service cable 125a placed in the gap and moved toward the center of the cable seal 130, and the cable seal 130 released to close the gap.

Figure 6:
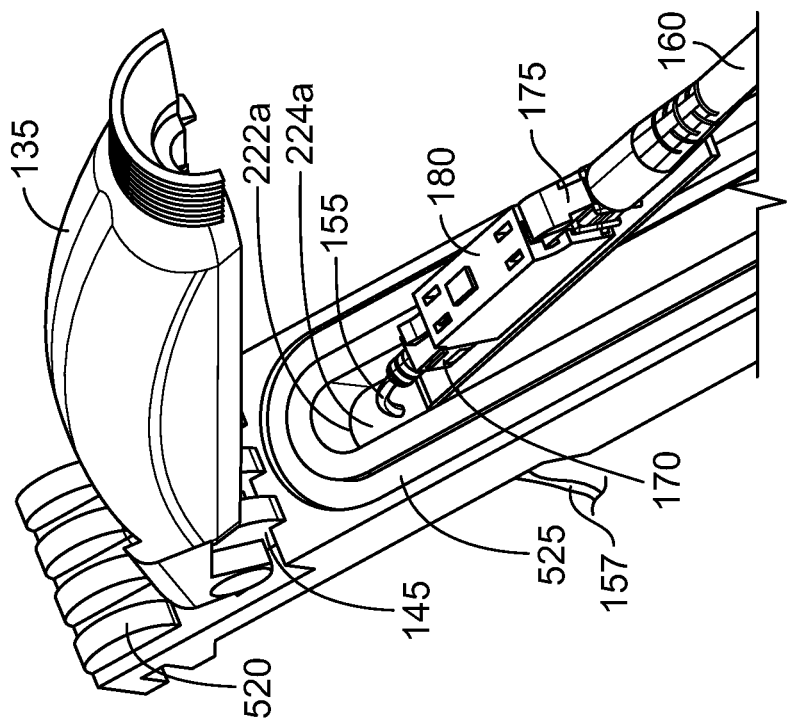
FIG. 6 is a detailed view a portion of the substructure of FIG. 5A.

Another view of sub-structure 110a is shown in FIG. 6. FIG. 6 is a detailed view a portion of the substructure of FIG. 5A. In FIG. 6, a port sealer 224a and a port opening of port 220a can be seen. In some embodiments, the port sealer 224a creates a watertight seal between the port opening 222a and the internal cable 157. In other embodiments, the sealer 224a does not create a watertight seal between the port opening 222a and the internal cable 157, but still serves to hold the end 155 of cable 157 within enclosure 220A. The sealer 224a may be cylindrically shaped piece of plastic with an O-ring positioned on its outer surface and a hole for allowing the internal cable 157 to pass through. In other configurations, the sealer 224a may be a cylindrically shaped piece of rubber having a hole for allowing the internal cable 157 to pass through. In still other configurations, the sealer 224a may be poured silicone. An alternative to sub-structure 110a is shown in FIG. 7A.

Figure 7:
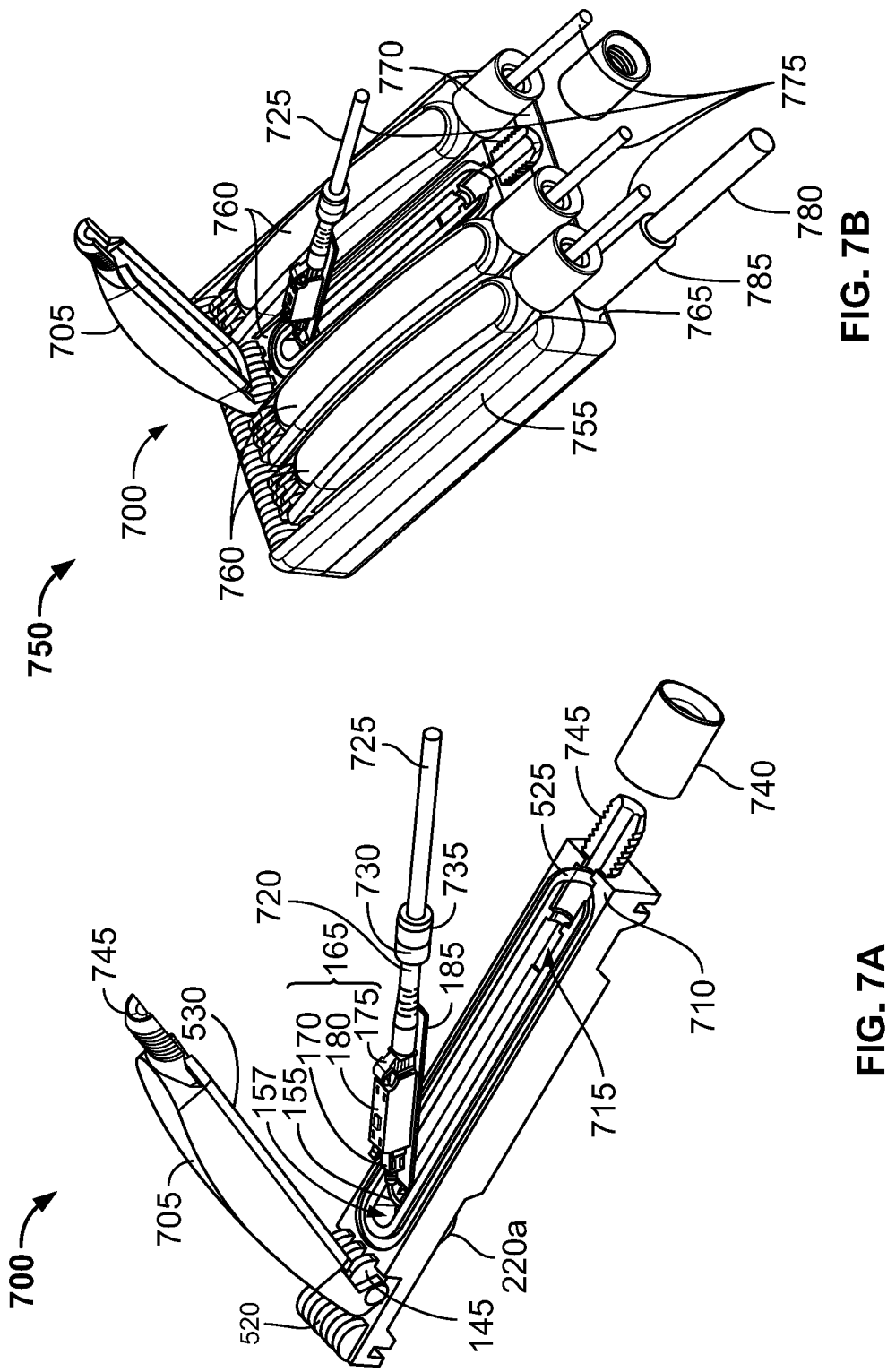
FIG. 7A is a perspective view of an embodiment of a sub-structure of a multi-cable terminal, with the sub-structure shown in an open position.
FIG. 7B is a perspective view of a multi-cable terminal which employs the sub-structure of FIG. 7A, with the sub-structure shown in an open position.

FIG. 7A is a perspective view of a sub-structure 700 in an open position. The sub-structure 700 includes a lid 705 and a base 710 and may be employed, for example, as one of the sub-structures 420 in the FIG. 4A embodiment. The sub-structure 700 defines an enclosure 715. The sub-enclosure 715 is configured to accommodate at least an end 155 of internal cable 157, an end 720 of a service cable 725, a cable anchor 730, and a cable seal 735. The sub-enclosure 715 is further configured to accommodate cable connection elements 165 including first connector 170 for the end 155 of the internal cable 157, second connector 175 for the end 720 of the service cable 725, and an adaptor 180 for coupling the first connector 170 to the second connector 175. In this manner, the internal cable 157 and service cable 725 may be coupled to one another by way of the first connector 170, second connector 175 and adaptor 180. In addition, the sub-enclosure 715 may be configured to accommodate support member 185.

In some embodiments, when the end 155 of the internal cable 157, the end 720 of the service cable 725, the cable anchor 730 and cable seal 735, and the cable connection elements 165 are positioned in the sub-enclosure 715, and the lid 705 of the sub-structure 700 is closed against the base 710 of the sub-structure 700, a watertight seal is created around the cable connection elements 165. Further, a fastener 740 may be provided for securing the sub-structure 700 in the closed position. In the FIG. 7A configuration, the fastener 740 is threaded for engagement with a threaded end 745 of the sub-structure 700, and the service cable 725 passes through the fastener 745 when the end 720 of the service cable 725 is positioned in the sub-enclosure 715 and the sub-structure 700 is secured in the closed position.

Notably, the sub-structure 700 differs from the sub-structure 110a in that sub-structure 700 does not include an anchoring portion like anchoring portion 505 of sub-structure 110a. That is, sub-structure 700 does not include and anchoring portion that is an integral part or removal part to the sub-structure 700. Rather, cable anchoring is provided in the FIGS. 7A and 7B configuration by cable anchor 730, which may be placed onto the service cable 725 or may be an integral part of the cable 725. The cable anchor 730 is operable to inhibit movement of service cable 725, relative to the sub-structure 700, in a direction along the axis of service cable 725 when the end 720 of service cable 725 and cable anchor are positioned in the enclosure 715 and the sub-structure 700 is closed.

FIG. 7B shows sub-structure 700 as incorporated into a multi-cable terminal 750. The multi-cable terminal 750 includes a frame 755 and a multiple of sub-structures 760, including sub-structure 700. The frame 755 includes a main cable section 765 and an accessory section 770. The sub-structures 760 are configured to accommodate respective service cables 775, including service cable 725. The main cable section 765 is configured to accommodate a main cable 780 and a main cable seal 785. The accessory section 770, by way of example, may house one or more accessories such as one or more splitters, splice trays, tap modules, wavelength division multiplexors (WDMs), and/or monitoring systems. For example, the accessory section 770 may house a tap module and a monitoring system, with the tap module used to split off a small percentage of signals carried by one of service cables 775 and the monitoring system used to analyze the split off portion of a signal.

Figure 8:
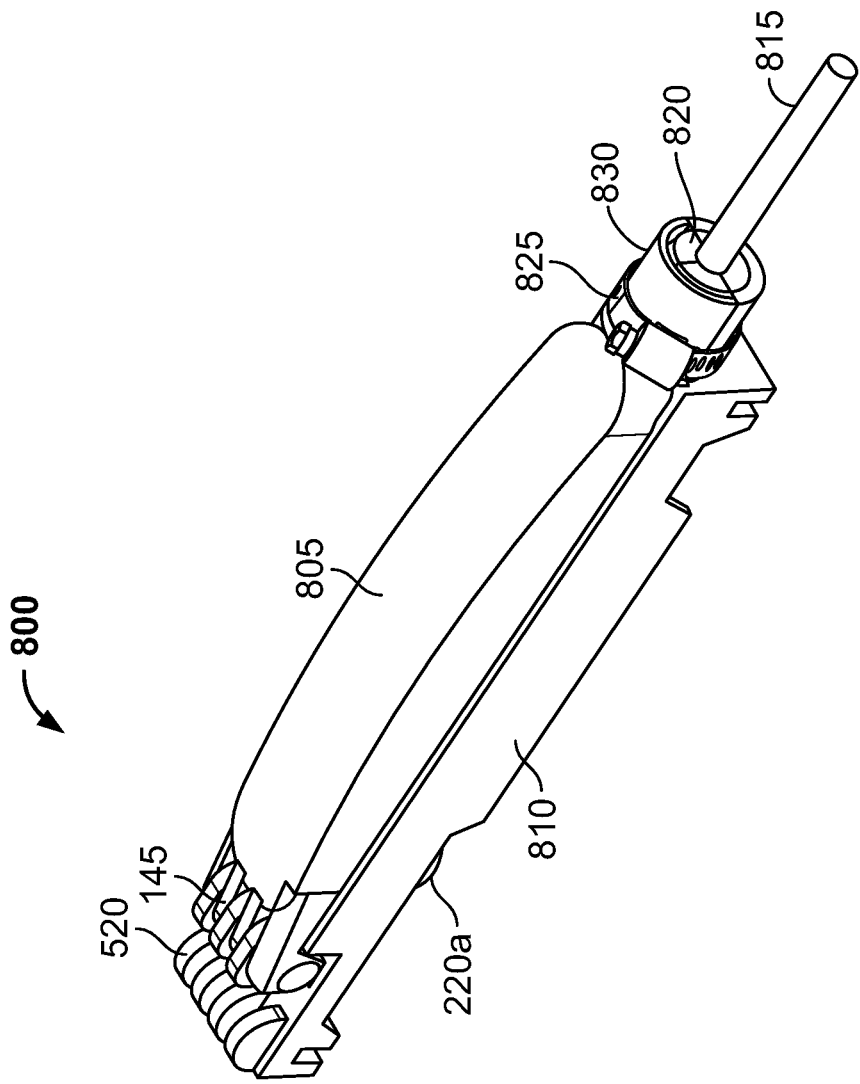
FIG. 8 is a perspective view of an embodiment of a sub-structure of a multi-cable terminal, with the sub-structure shown in a closed position.

Referring now to FIG. 8, there is shown a sub-structure 800 in accordance with an embodiment. The sub-structure 800 includes a lid 805 and a base 810 and is configured to accommodate a service cable 815 and a cable seal 820. The sub-structure 800 is shown in the closed position. To secure the sub-structure 800 in the closed position a hose clamp 825 is tightened about an unthreaded end 830 of the sub-structure 800. Accordingly, the hose clamp 825 demonstrates an alternative type of fastener that may be used to secure closure of the sub-structures of the present technology. For example, the hose clamp 825 and unthreaded end 830 may be used in lieu of the fastener 187 and threaded end 190 of the FIG. 1C, or the fastener 740 and threaded end 745 of FIG. 7A. Further, it should be noted that a wide range of possible configurations for securing closure of the sub-structures are not explicitly described in this description but will be readily appreciated in view of this description.

Figure 9:
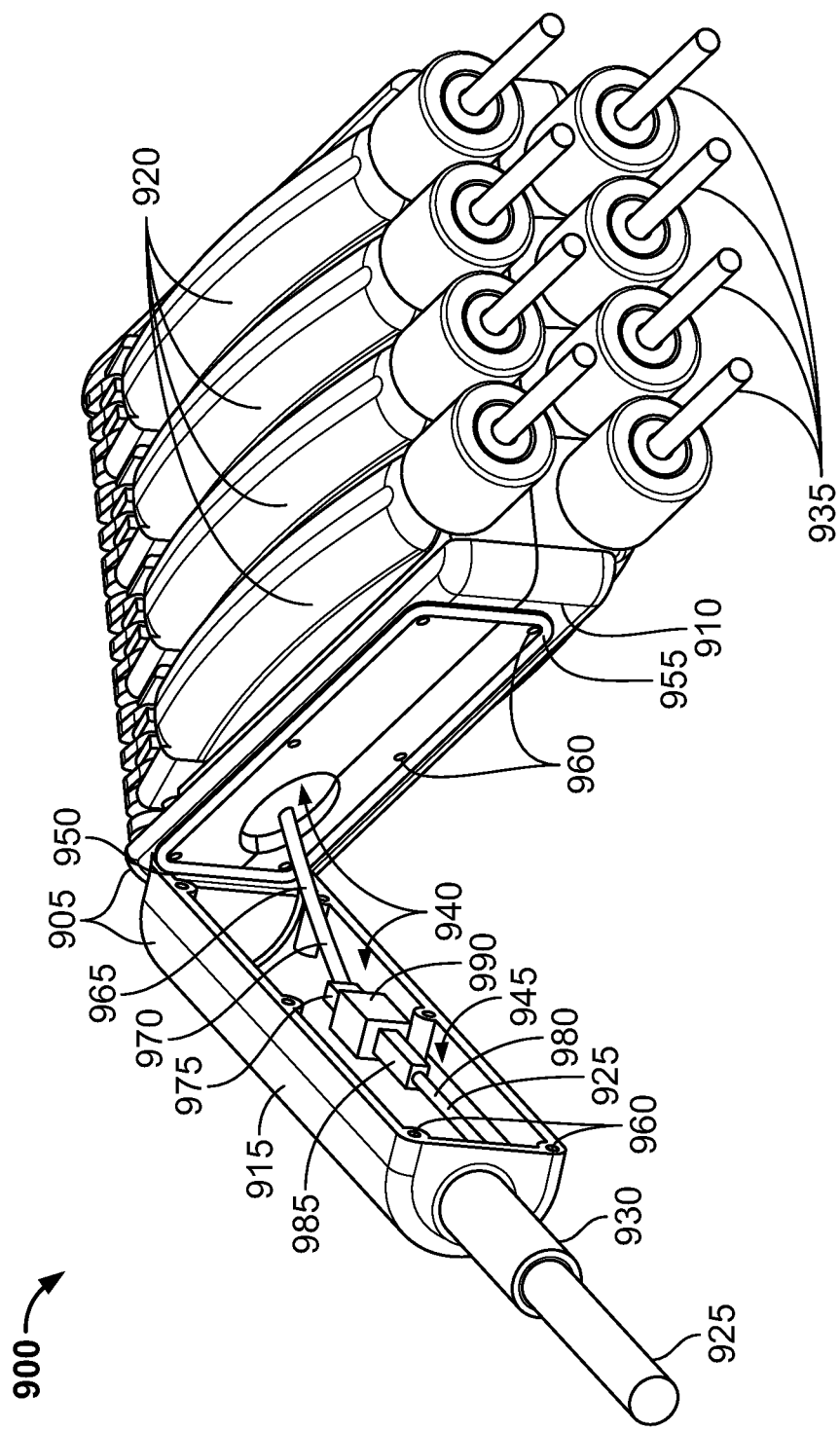
FIG. 9 is a perspective view of a multi-cable terminal according to an embodiment having an openable main cable section.

Turning now to FIG. 9, there is shown is a perspective view of a multi-cable terminal 900 according to an embodiment. The multi-cable terminal 900 includes a frame 905 having a primary section 910 and an openable main cable section 915, and a multiple of sub-structures 920. The openable main cable section 915 is configured to accommodate a main cable 925 and a main cable seal 930. The sub-structures 920 are configured to accommodate respective ones of service cables 935. The frame 905 and sub-structures 920 define a main enclosure 940 when they are closed relative to one another, with the openable main cable section 915 defining a main sub-enclosure 945 portion of the main enclosure. More specifically, the main enclosure 940 is formed when the sub-structures 920 are in a closed position relative to the primary section 910 and the openable main cable section 915 is closed relative to the primary section 910. Notably, the main enclosure 940 may be a watertight enclosure.

The multi-cable terminal 900 is configured so that the openable main-cable section 915 is readily openable and re-closable when the main-cable terminal 900 is deployed in the field. In this regard, the multi-cable terminal 900 may include a hinge 950, a gasket 955, and fastening points 960. The openable main cable section 915 may be closed against the primary section 910 by moving the openable main cable section 915 about the hinge 950 to contact the gasket 955. Further, the openable main cable section 915 may be secured in the closed position my inserting fasteners, such as screws, into the fastening points 960. Accordingly, the openable main cable section 915 may be readily opened by loosening or removing the fasteners.

Also shown in FIG. 9 is an alternative internal cabling structure. In the FIG. 9 embodiment, the multi-cable terminal 900 includes an internal distribution cable 965 from which a multiple of internal cables (not shown) are fanned out. In the depicted configuration, the fanning out is implemented within the primary section 910, although other implementations are possible, such as fanning out the internal cables in the openable main cable section 915. In any event, the main sub-enclosure 945 is configured to accommodate an end 970 of the internal distribution cable 965, a first connector 975 (e.g., a Multi-fiber Push On, MPO, connector) for the end 970 of the internal distribution cable 965, an end 980 of the main cable 925, a second connector 985 (e.g., an MPO connector) for the end 980 of the main cable 925, and an adaptor 990 (e.g., an MPO adaptor). As shown, the first connector 975 and second connector 985 may be plugged into the adaptor 990 to communicatively couple the main cable 925 to the internal distribution cable 965. As also shown, when the end 980 of the main cable 925 is positioned in the main sub-enclosure 945, the main cable seal is positioned in the openable main cable section 915, and the openable main cable section 915 is in the closed position, a seal is created around the end 980 of the main cable 925, the first connector 975, the second connector 985, and the adaptor 990. Notably, such seal may be a watertight seal.

Having described several multi-cable terminal embodiments with frames having a distinct main cable section, it is noted that the present technology does not require a frame having a distinct main cable section.

Figure 10B:
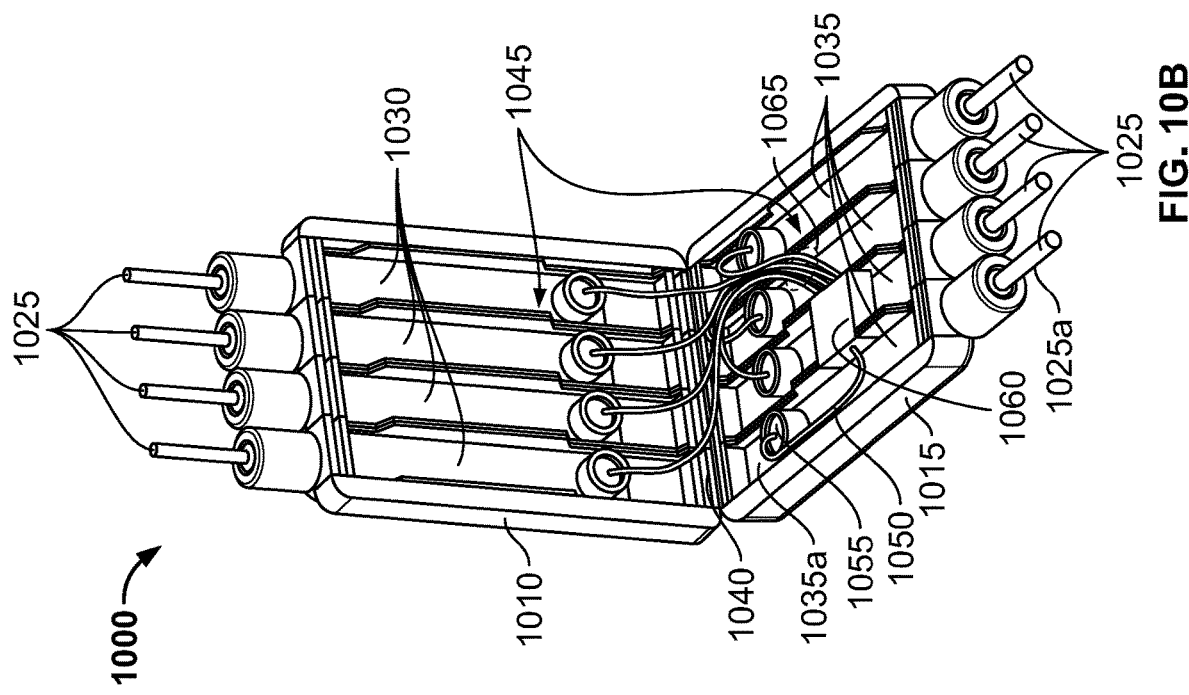
FIG. 10B is a perspective view of the multi-cable terminal of FIG. 10A with the frame in an open position.
Figure 10A:
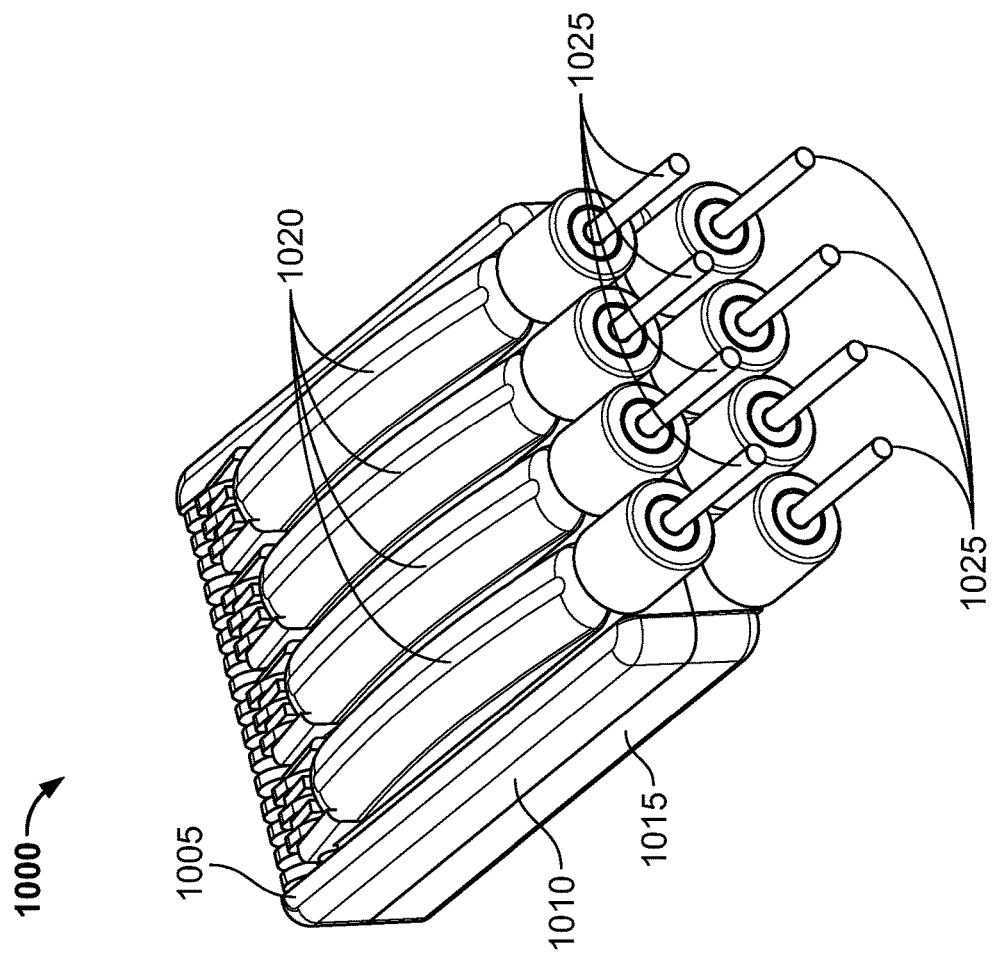
FIG. 10A is a perspective view of a multi-cable terminal according to an embodiment having a frame that does not include a distinct main cable section.

FIG. 10A is a perspective view of a multi-cable terminal 1000 of an embodiment that does not include a distinct main cable section. The multi-cable terminal 1000 includes a frame 1005 made up of a first frame portion 1010 and a second frame portion 1015, and a multiple of sub-structures 1020. The sub-structures 1020 are configured to accommodate respective ones of service cables 1025. By way of example, each of sub-structures 1020 may be in the form of sub-structure 110a, although the sub-structures 1020 are not limited to the form of sub-structure 110a. The sub-structures 1020 may include some sub-structures having the form of sub-structure 110a and other sub-structures that take a different form. Or the sub-structures 1020 may include only sub-structures having a form different from the form of sub-structure 110a.

FIG. 10B is a perspective view of the multi-cable terminal 1000 of FIG. 10A with the frame 1005 in an open position. As can be seen from FIG. 10B, the first frame portion 1010 may be configured to support a first group of sub-structures 1030 from among sub-structures 1020, and the second frame portion 1015 may be configured to support a second group of sub-structures 1035 from among sub-structures 1020. By way of example, each of the sub-structures in the first group of sub-structures 1030, and each of the sub-structures in the second group of sub-structures 1035 may be in the form of sub-structure 110a. As can be further seen from FIG. 10B, the first frame portion 1010 and the second frame portion 1015 may be connected to each other by a hinge 1040, and when the first frame portion 1010 and/or second frame portion 1015 are rotated about hinge 1040 so that they contact each other, the frame 1005 is in a closed position and a main enclosure 1045 is defined by first frame portion 1010, second frame portion 1015, and sub-structures 1020. Such main enclosure 1045 may be a watertight enclosure. Further, in some embodiments, the frame 1005 and sub-structures 1020 may be held in a watertight closed position by one or more types of fastening, including, for example, screwing, gluing, and welding.

In the configuration of FIGS. 10A and 10B, one of the service cables 1025 may function as a main cable. For purposes of illustration, FIG. 10B shows an embodiment in which service cable 1025a functions as a main cable. As can be seen from FIG. 10B, service cable 1025a is accommodated by a sub-structure 1035a of the second group of sub-structures 1035. In a sub-enclosure (not shown) of sub-structure 1035a the service cable 1025a is coupled to an internal cable 1050 in a manner such as the manner in which service cable 125a is coupled to internal cable 157 (see e.g., FIG. 5A). The internal cable 1050 is passed between a sub-enclosure (not shown) of sub-structure 1035a and the main enclosure 1045 via a port 1055 of sub-structure 1035a. In the main enclosure 1045, the internal cable 1050 is coupled to a connecting module 1060. The connecting module 1060 couples the internal cable 1050 to other internal cables 1065, with the other internal cables 1065 being respectively passed to sub-enclosures (not shown) of the other sub-structures 1020, i.e., the substructures 1020 other than sub-structure 1035a. In this manner the service cable 1025a is communicatively coupled with the other service cables 1025, i.e., the service cables 1025 other than service cable 1025a. The connecting module 1060 may be, for example, a splitter, a wavelength division multiplexer (WDM) module, a tap module, a monitoring system, or a fan-out assembly, with a fan-out assembly being particularly applicable when the service cable 1025a is a multi-fiber cable.

Figure 11:
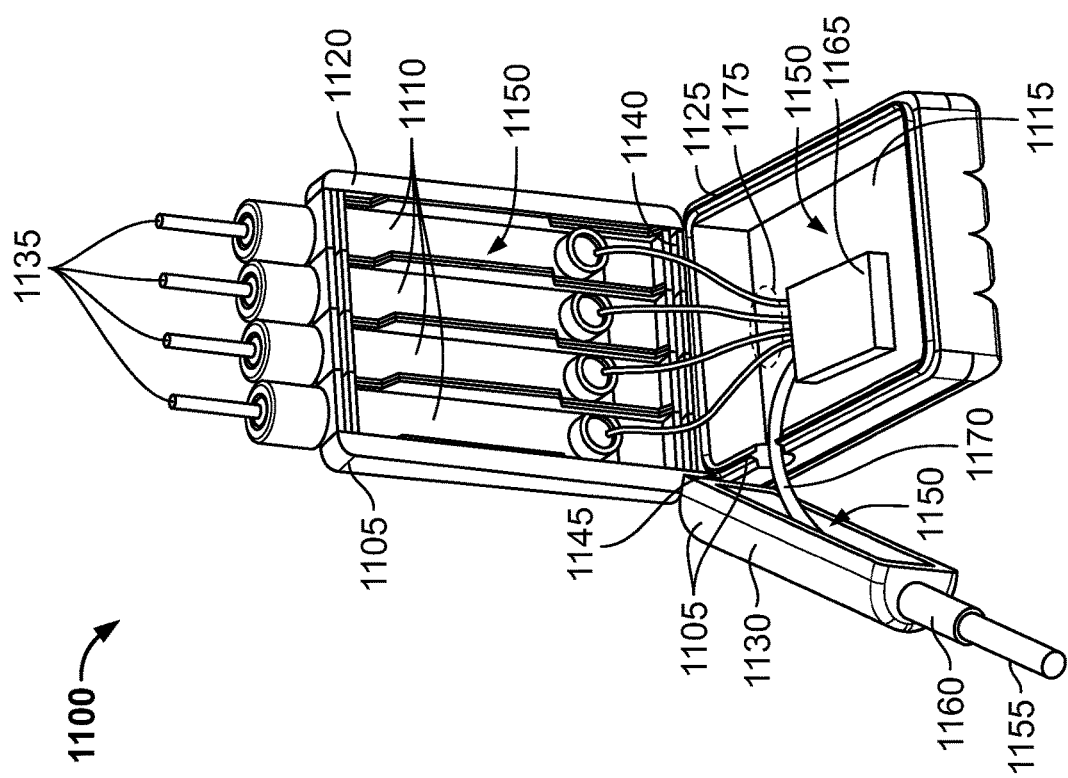
FIG. 11 is a perspective view of a multi-cable terminal of an embodiment including an accessory section, with the frame shown in an open position.

Turning now to FIG. 11, there is shown a perspective view of another embodiment employing a connecting module feature. FIG. 11 shows a multi-cable terminal 1100 including a frame 1105, sub-structures 1110, and an accessory section 1115, with the frame 1105 shown in an open position. The frame 1105 is made up of a first frame portion 1120, a second frame portion 1125, and a main cable section 1130. The sub-structures 1110 are configured to accommodate respective ones of service cables 1135. By way of example, each of sub-structures 1110 may be in the form of sub-structure 110a, although the sub-structures 1110 are not limited to the form of sub-structure 110a. The sub-structures 1110 may include some sub-structures having the form of sub-structure 110a and other sub-structures that take a different form. Or the sub-structures 1110 may include only sub-structures having a form different from the form of sub-structure 110a.

As can be seen from FIG. 11, the first frame portion 1120 may be configured to support the sub-structures 1110, and the second frame portion defines the accessory section 1115. As can be further seen from the figure, the first frame portion 1120 and the second frame portion 1125 may be connected to each other by a hinge 1140, and the main cable section 1130 may be connected to one of the frame portions (first frame portion 1125 in the depicted embodiment) by a hinge 1145. When the first frame portion 1120 and/or second frame portion 1125 are rotated about hinge 1140 so that they contact each other, and the main cable section 1130 is rotated about hinge 1145 to contact the two frame portions 1120 and 1125, the frame 1105 is in a closed position and a main enclosure 1150 is defined by first frame portion 1120, second frame portion 1125, main cable section 1130, and sub-structures 1110. Such main enclosure 1150, with a main cable 1155 and main cable seal 1160 positioned in the main cable section, may be a watertight enclosure. In some embodiments, the frame 1105 and sub-structures 1110 may be held in a watertight closed position by one or more types of fastening, including, for example, screwing, gluing, and welding. Further, it should be noted that the multi-cable terminal 1100 need not include hinge 1140 or hinge 1145. For example, the first frame portion 1120, second frame portion 1125, main cable section 1130, and sub-structures 1110 may be positioned without the use of hinges 1140 and 1145 and then glued or welded into place, or fixed into place with one or more screws.

The multi-cable terminal 1100 of FIG. 11 includes a connecting module 1165. As shown, the connecting module 1165 may be positioned in the accessory section 111 and may be coupled to a primary cable 1170 and a multiple of internal cables 1175. The primary cable 1170 may take the form of an internal distribution cable, like internal distribution cable 965 of FIG. 9, that is connectively coupled to the main cable 1155, or may be an integral part of the main cable 1155. In either case, the primary cable 1170, connecting module 1165 and internal cables 1175 may be used to provide communicative coupling between the main cable 1155 and the service cables 1135. The connecting module 1165 may be, for example, a splitter, a wavelength division multiplexer (WDM) module, a tap module, a monitoring system, or a fan-out assembly, with a fan-out assembly being particularly applicable when the primary cable 1170 is a multi-fiber cable.

Embodiments of the present technology include, but are not restricted to, the following.

(1) A multi-cable terminal including a plurality of sub-structures, each of the sub-structures defining a sub-enclosure and being openable independent of the other sub-structures to provide access to the sub-enclosure; and a frame that secures the plurality of sub-structures such that the frame and sub-structures define a main enclosure, wherein each of the sub-enclosures is configured to accommodate at least an end of an internal cable, an end of a service cable, and a plurality of cable connection elements, such that when the end of the internal cable, the end of the service cable, and the cable connection elements are positioned in the sub-enclosure and a cable seal for the service cable is positioned in the corresponding sub-structure, a watertight seal is created around the cable connection elements when the corresponding sub-structure is closed.

(2) The multi-cable terminal according to (1), wherein the frame is configured to accommodate at least an end of a main cable and a main cable seal for the main cable.

(3) The multi-cable terminal according to (2), wherein the internal cable is a fiber optic cable, the service cable is a fiber optic cable, and the main cable is a fiber optic cable.

(4) The multi-cable terminal according to (2), wherein the internal cable is fanned out from the main cable.

(5) The multi-cable terminal according to (1), wherein the internal cable is a fiber optic cable and the service cable is a fiber optic cable.

(6) The multi-cable terminal according to (1), further including an internal distribution cable, and wherein the internal cable is fanned out from the internal distribution cable.

(7) The multi-cable terminal according to (1), wherein the cable connection elements include a first cable connector for the end of the internal cable, a second cable connector for the end of the service cable, and an adaptor, and wherein the adaptor is configured to couple the first cable connector to the second cable connector.

(8) The multi-cable terminal according to (7), wherein each of the sub-structures further includes a support member for securing the adaptor, the adaptor being movable with the support member when the sub-structure is open.

(9) The multi-cable terminal according to (8), wherein the support member moves automatically into an exposed position when the substructure is opened.

(10) The multi-cable terminal according to (1), wherein the service cable is part of a group of cables that are introduced into the sub-enclosure.

(11) The multi-cable terminal according to (1), wherein the service cable includes a plurality of optical fibers.

(12) The multi-cable terminal according to (1), wherein the service cable includes a plurality of electric wires.

(13) The multi-cable terminal according to (1), wherein the service cable includes at least one optical fiber and at least one electric wire.

(14) The multi-cable terminal according to (1), wherein each of the sub-structures further includes a fastener for securing the sub-structure in a closed position.

(15) The multi-cable terminal according to (1), wherein each sub-enclosure includes an anchoring portion which contacts the service cable when the end of the service cable is positioned in the sub-enclosure, and which inhibits movement of the service cable relative to the multi-cable terminal in a direction along the axis of the service cable.

(16) The multi-cable terminal according to (1), further including at least one of a splitter, a splice tray, a wavelength division multiplexer (WDM), or a tap module.

(17) The multi-cable terminal according to (1), wherein the frame includes a main cable section defining a main sub-enclosure, the main cable section being openable independent of the sub-structures to provide access to the main sub-enclosure, wherein the main sub-enclosure makes up a portion of the main enclosure, wherein the main sub-enclosure is configured to accommodate at least an end of a main cable, and wherein the main cable section is configured to accommodate a main cable seal.

(18) The multi-cable terminal according to (17), wherein when the end of the main cable is positioned in the main sub-enclosure and the main cable seal is positioned in the main cable section, a watertight seal is created around the end of the main cable when the main cable section is closed.

(19) The multi-cable terminal according to (1), wherein each of the sub-enclosures is further configured to accommodate an anchor for the respective service cable.

(20) The multi-cable terminal according to (1), wherein the frame includes an openable main cable section and a primary section, and the openable main cable section is configured to accommodate an end of an internal distribution cable, a first connector for the end of the internal distribution cable, an end of a main cable, a second connector for the end of the main cable, and an adaptor configured to couple the first connector to the second connector.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A multi-cable terminal comprising:
a plurality of sub-structures, each of the sub-structures comprising a lid and a base defining a sub-enclosure, and the sub-structure being openable from a closed configuration of the sub-structure to an open configuration of the sub-structure, independent of the other sub-structures, by moving the lid from the base to provide access to the sub-enclosure; and
a frame that secures the plurality of sub-structures such that the frame and sub-structures define a main enclosure,
wherein each of the sub-enclosures is configured to accommodate at least an end of an internal cable, an end of a service cable, and a plurality of cable connection elements, such that when the end of the internal cable, the end of the service cable, and the cable connection elements are positioned in the sub-enclosure and a cable seal for the service cable is positioned in the corresponding sub-structure, a watertight cable seal is created between the service cable and the corresponding sub-structure when the corresponding sub-structure is closed by securing the lid against the base, and
wherein each of the plurality of sub-structures comprises a port having a port opening and a port seal, and wherein, for each sub-structure, the internal cable is provided to the sub-enclosure of the sub-structure through the port of the sub-structure, the port of the sub-structure providing a watertight port seal between the internal cable and the sub-structure and between the sub-enclosure of the sub-structure and the main enclosure.

2. The multi-cable terminal according to claim 1, wherein the frame is configured to accommodate at least an end of a main cable and a main cable seal for the main cable.

3. The multi-cable terminal according to claim 2, wherein the internal cable is a fiber optic cable, the service cable is a fiber optic cable, and the main cable is a fiber optic cable.

4. The multi-cable terminal according to claim 2, wherein the internal cable is fanned out from the main cable.

5. The multi-cable terminal according to claim 1, wherein the internal cable is a fiber optic cable and the service cable is a fiber optic cable.

6. The multi-cable terminal according to claim 1, further comprising an internal distribution cable, and wherein the internal cable is fanned out from the internal distribution cable.

7. The multi-cable terminal according to claim 1, wherein the cable connection elements comprise a first cable connector for the end of the internal cable, a second cable connector for the end of the service cable, and an adaptor, and wherein the adaptor is configured to couple the first cable connector to the second cable connector.

8. The multi-cable terminal according to claim 7, wherein each of the sub-structures further comprises a support member for securing the adaptor, the adaptor being movable with the support member when the sub-structure is open.

9. The multi-cable terminal according to claim 8, wherein the support member moves automatically into an exposed position when the substructure is opened.

10. The multi-cable terminal according to claim 1, wherein the service cable is part of a group of cables that are introduced into the sub-enclosure.

11. The multi-cable terminal according to claim 1, wherein the service cable comprises a plurality of optical fibers.

12. The multi-cable terminal according to claim 1, wherein the service cable comprises a plurality of electric wires.

13. The multi-cable terminal according to claim 1, wherein the service cable comprises at least one optical fiber and at least one electric wire.

14. The multi-cable terminal according to claim 1, wherein each of the sub-structures further comprises a fastener for securing the sub-structure in a closed position.

15. The multi-cable terminal according to claim 1, wherein each sub-enclosure includes an anchoring portion which contacts the service cable when the end of the service cable is positioned in the sub-enclosure, and which inhibits movement of the service cable relative to the multi-cable terminal in a direction along the axis of the service cable.

16. The multi-cable terminal according to claim 1, further comprising at least one of a splitter, a splice tray, a wavelength division multiplexer (WDM), or a tap module.

17. The multi-cable terminal according to claim 1, wherein the frame comprises a main cable section defining a main sub-enclosure, the main cable section being openable independent of the sub-structures to provide access to the main sub-enclosure, wherein the main sub-enclosure makes up a portion of the main enclosure, wherein the main sub-enclosure is configured to accommodate at least an end of a main cable, and wherein the main cable section is configured to accommodate a main cable seal.

18. The multi-cable terminal according to claim 17, wherein when the end of the main cable is positioned in the main sub-enclosure and the main cable seal is positioned in the main cable section, a watertight seal is created around the end of the main cable when the main cable section is closed.

19. The multi-cable terminal according to claim 1, wherein each of the sub-enclosures is further configured to accommodate an anchor for the respective service cable.

20. The multi-cable terminal according to claim 1, wherein the frame comprises an openable main cable section and a primary section, and the openable main cable section is configured to accommodate an end of an internal distribution cable, a first connector for the end of the internal distribution cable, an end of a main cable, a second connector for the end of the main cable, and an adaptor configured to couple the first connector to the second connector.

* * * * *